United States Patent
Mostafa et al.

(10) Patent No.: US 7,450,924 B1
(45) Date of Patent: Nov. 11, 2008

(54) INTERFERENCE CANCELLATION AND RECEIVE DIVERSITY FOR SINGLE-VALUED MODULATION RECEIVERS

(75) Inventors: Ayman Mostafa, Alpharetta, GA (US); Richard A. Kobylinski, Austin, TX (US); Arunhaba Ghosh, Austin, TX (US)

(73) Assignees: AT&T Mobility II LLC, Atlanta, GA (US); SBC Knowledge Ventures, L.P., Reno, NV (US)

( * ) Notice: Subject to any disclaimer, the term of this patent is extended or adjusted under 35 U.S.C. 154(b) by 573 days.

(21) Appl. No.: 11/088,368

(22) Filed: Mar. 24, 2005

Related U.S. Application Data

(60) Provisional application No. 60/556,228, filed on Mar. 25, 2004.

(51) Int. Cl.
*H04B 1/10* (2006.01)

(52) U.S. Cl. ............... 455/306; 455/302; 455/303; 455/304; 375/348; 375/232; 375/350

(58) Field of Classification Search ......... 455/302–307, 455/222, 67.13, 339; 375/348, 232, 350
See application file for complete search history.

(56) References Cited

U.S. PATENT DOCUMENTS

| | | | |
|---|---|---|---|
| 5,937,015 A | 8/1999 | Dent et al. | |
| 6,137,843 A | 10/2000 | Chennakeshu et al. | |
| 6,304,618 B1 | 10/2001 | Hafeez et al. | |
| 6,807,240 B2 | 10/2004 | Alamouti et al. | |
| 2002/0018517 A1 * | 2/2002 | Hara | 375/147 |
| 2002/0141437 A1 | 10/2002 | Meyer et al. | |
| 2003/0112370 A1 * | 6/2003 | Long et al. | 348/474 |
| 2003/0185181 A1 * | 10/2003 | Balachandran et al. | 370/337 |
| 2003/0185292 A1 * | 10/2003 | Fernandez-Corbaton et al. | 375/232 |
| 2004/0109670 A1 * | 6/2004 | Kim et al. | 386/46 |
| 2004/0192215 A1 * | 9/2004 | Onggosanusi et al. | 455/67.13 |
| 2005/0036575 A1 * | 2/2005 | Kuchi et al. | 375/348 |

OTHER PUBLICATIONS

Bingham, Ella and Hyvarinen, Aapo, "A fast-Fixed-Point Algorithm for Independent Component Analysis of Complex Valued Signals," International Journal of Neural Systems, vol. 10, No. 1, World Scientific Publishing Company, Feb. 2000, 8 pages.

(Continued)

*Primary Examiner*—Tuan A Pham
(74) *Attorney, Agent, or Firm*—Zagorin O'Brien Graham LLP

(57) ABSTRACT

A combined SAIC receiver and a multiple-antenna, receive diversity receiver are employed to reduce interference in a wireless system. The real and imaginary parts of the de-rotated signal for each receive path associated with an antenna are separately filtered and a combined output signal of all receive paths is generated. The weighting coefficients are adjusted based on an error signal produced by comparing the combined output signal with a reference signal. The weighting coefficients are initially set based on an MMSE/LS type of signal processing criteria, where the reference signal is the Training Sequence Code (TSC). Subsequent adjustment/tracking can be accomplished by using known tracking algorithms, e.g. LMS or RLS, or the coefficients can be re-computed using MMSE/LS processing. The reference signal for tracking may be a combination of the TSC and estimated data symbols provided by an equalizer.

17 Claims, 9 Drawing Sheets

OTHER PUBLICATIONS

Hyvarinen, Aapo and Oja, Erkki, "Independent Component Analysis: Algorithms and Applications," Helsinki University of Technology, Neural Networks, 13(4-5): 411-430, 2000.

Olofsson, Hakan et al., "Interference Diversity Gain in Frequency Hopping GSM," in Proceedings of Vehicular Technology Conference, 1995 IEEE 45th, Jul. 25-28, 1995, vol. 1, pp. 102-106.

U.S. Appl. No. 10/837,933, filed May 3, 2004 (May 2, 2003 priority date), entitled "Systems and Methods for Interference Cancellation in a Radio Receiver System," naming inventor Ayman A. Mostafa, 45 pages.

U.S. Appl. No. 10/837,933, filed May 3, 2004, Mostafa.

Buehrer, R. Michael, et al., "Intelligent Antennas for Wireless Communications—Uplink," Bell Labs Technical Journal, Jul.-Sep. 1999, pp. 73-103.

Craig, Stephen and Johan Axnäs, "A System Performance Evaluation of 2-Branch Interference Rejection Combining," IEEE Vehicular Technology Conference, 1995, pp. 1887-1891.

Haykin, S., *Adaptive Filter Theory*, third edition, chapters 5 and 11, Prentice-Hall, Inc., 1996, pp. 194-207 and 483-494.

Lee, William C. Y., *Mobile Communications Design Fundamentals*, second edition, chapter 6, 1993, title page and pp. 199-225.

Mostafa, Ayman, et al., "Single Antenna Interference Cancellation (SAIC) for GSM Networks," IEEE Vehicular Technology Conference, Oct. 2003, pp. 1089-1093.

Mostafa, Ayman, et al., "Single Antenna Interference Cancellation (SAIC) Method in GSM Network," IEEE Vehicular Technology Conference, Sep. 2004, 5 pages.

Proakis, John G., *Digital Communications*, second edition, chapter 7, McGraw-Hill, 1989, title page and pp. 702-799.

"SAIC and Synchronized Networks for Increased GSM Capacity," prepared by 3G Americas' SAIC working group, Mark Austin, editor, Sep. 2003, pp. 1-26.

Trigui, Hafedh and Dirk T. M. Slock, "Cochannel Interference Cancellation Within the Current GSM Standard," Proceedings of the IEEE 1998 International Conference on Universal Personal Communications, Oct. 5-9, 1998, Florence, Italy, pp. 511-515.

Hyvärinen, Aapo and Oja, Erkki, "Independent Component Analysis: A Tutorial," Helsinki University of Technology, Laboratory of Computer and Information Science, Apr. 1999, pp. 1-30.

Vainio, Olli et al., "Multistage Adaptive Filters for In-Phase Processing of Line-Frequency Signals," IEEE Instrumentation and Measurement Technology Conference, Ottawa, Canada, May 19-21, 1997, 6 pages.

\* cited by examiner

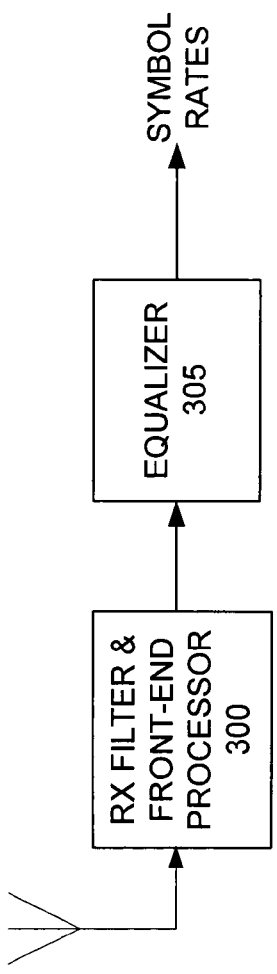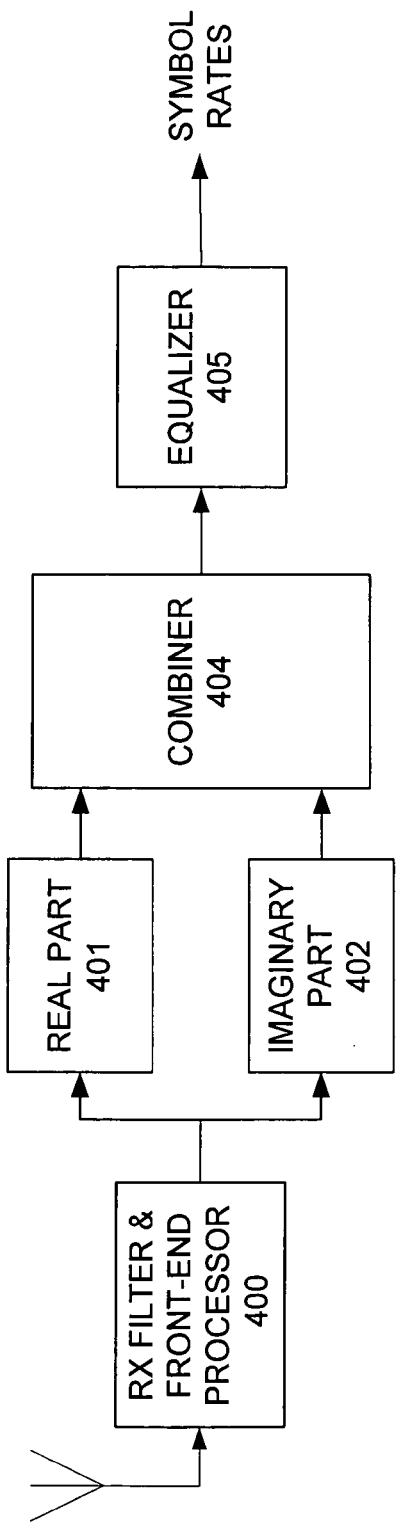

INTERFERENCE CANCELLATION AND RECEIVE DIVERSITY FOR SINGLE-VALUED MODULATION RECEIVERS

CROSS-REFERENCE TO RELATED APPLICATION(S)

This application claims benefit under 35 U.S.C. § 119(e) to U.S. Provisional Patent Application No. 60/556,228, filed Mar. 25, 2004, which is incorporated by reference herein in its entirety.

BACKGROUND

1. Field of the Invention

This application relates to interference cancellation in an antenna receiver, specifically as such interference cancellation applies to wireless telecommunications.

2. Description of the Related Art

One of the major problems that limit performance in cellular networks today is self-interference, both co-channel and adjacent channel. One of the main reasons that interference is such a problem is that cellular operators are trying to maximize the spectral efficiency of their networks by decreasing the reuse factor. The reuse factor defines how often the same radio channel (frequency) is reused within a group of cell sites and sectors, and thus, the smaller the reuse factor the more radio channels per site/sector, which increases the spectral efficiency. Unfortunately, as the reuse factor is decreased, the amount of interference is increased, because the physical distance between the receiver of interest and the interference is decreased.

There are a number of methods that have been developed for canceling, suppressing, or otherwise mitigating interference in a cellular network. One of the more common techniques used at a base station is to employ two receive antennas for the purposes of interference cancellation. There are a number of signal processing algorithms that have been developed for base station applications including Interference Rejection Combining (IRC) and Two-Branch Intelligent Antenna (TBIA). See for example, "A System Performance Evaluation of 2-Branch Interference Rejection Combining", VTC 1995, S. Craig, et al.; and "Intelligent Antennas for Wireless Communications—Uplink" Bell Labs Technical Journal, R. Buehrer, et al. These techniques have been applied to TDMA and GSM cellular networks. The use of two or more antennas provides receive diversity since the antennas provide separate, "diverse" channels, through which the transmitted signal propagates. With two antennas, the receiver is said to have a diversity order of L=2. If these two channels exhibit a sufficient amount of de-correlation then the aforementioned signal processing algorithms can be employed to cancel a certain amount of interference, and also provide gain in noise-limited conditions as well.

Although the use of two receive antennas is generally applicable at the mobile terminal as well, there are cost, space, and aesthetic issues, which to date, have prevented wide-scale deployment, especially in the traditional mobile terminal. Because of these issues, there has recently been significant effort expended to develop techniques that suppress interference using just one receive antenna, particularly for GSM voice and packet data services. See for example, "Single Antenna Interference Cancellation (SAIC) for GSM Networks", VTC, 2003, A. Mostafa, et al. These techniques are collectively referred to as Single Antenna Interference Cancellation (SAIC).

The GSM circuit-switched voice service and the first-generation, packet-switched data service, referred to as GPRS, employ Gaussian Minimum Shift Keying (GMSK) modulation. GMSK is a binary modulation scheme, which implies that each input bit produces a modulator output symbol. In addition, GMSK is also a single-valued modulation scheme, which implies that two signal constellation points take on only one value suitably modified by +−1, and that these points lie on the same axis. Single-valued modulation schemes such as GMSK and Binary Phase Shift Keying (BPSK) have a unique characteristic in that they can be split into two virtual paths at the receiver by processing of the real and imaginary parts. When a co-channel or adjacent channel interferer is present that traverses a different channel than the desired signal, a receiver can exploit these two virtual paths to achieve an effective diversity order L=2. "Co-channel Interference Cancellation Within the Current GSM Standard", Proceedings of the IEEE 1998 International Conference on Universal Personal Communications, Oct. 5-9 1998, Florence, Italy, H. Trigui, et al., discusses this methodology. The two paths can be processed using conventional signal processing algorithms for interference cancellation.

The amount of gain achievable with two receive antennas for a typical cellular uplink, or the two virtual paths created by suitable processing of the GMSK signal for the downlink, is limited by the amount of correlation between the paths. The correlation value is typically defined as the correlation coefficient of the signal envelopes. The smaller the correlation, the greater the gain, and conversely, the greater the correlation the smaller the gain. In the limit, the maximum gain is achieved when the paths are identically and independently distributed (i.i.d.), which corresponds to a correlation of zero. Unfortunately, the maximum gain has not been realized in practice. As known in the art, a typical correlation value for two cellular base station antennas is approximately 0.7. Thus, the gain is decreased from the maximum achievable. To achieve lower levels of correlation requires greater spatial separation of the two receive antennas, which is limited by the space available, both at the base station and the mobile terminal. However, decreasing correlation beyond what is achievable today is not typically an option, so one must look for other methods to increase the interference cancellation gain.

SUMMARY

One way to increase interference cancellation gain is to increase the diversity order of the receiver. Accordingly, according to an embodiment of the invention, increased gains from interference cancellation is achieved by combining the two-antenna receive diversity approach (typically associated with the base station receiver) with the SAIC, two virtual path processing associated with the mobile terminal receiver, thereby increasing the effective diversity order to L=4 in an exemplary two antenna system in interference limited conditions.

Various embodiments of the invention may be utilized in both the base station and the mobile terminal, where recent enhancements in chip density and signal processing make the support of two receive antennas and the associated receiver branches technically and economically feasible.

Embodiments of this invention may be particularly useful in communication systems that employ single-valued modulation, and where co-channel and/or adjacent channel interference limit performance.

The present invention addresses interference in the wireless communications industry. The methodology that has been developed may be implemented in a wireless device to suppress interference signals and improve the signal quality of the received signal. Various embodiments of the invention may permit a substantial increase in the reuse of frequencies in wireless communications, thereby increasing the capacity of the network significantly. The methodology of the present invention is applicable to wireless technologies employing real-valued modulation schemes such as GMSK or BPSK.

The present invention may be embodied in an antenna receiver used in such wireless communications. Such an antenna receiver would then be useful in a system in which the co-channel interference and adjacent channel interference may be increased in order to obtain significant capacity increases in the network.

The present invention may be embodied in the uplink stage of n multi-receivers in a Base Station Transceiver Subsystem (BTS) or in a mobile communications device.

In an embodiment a method is provided for reducing interference in a multiple antenna receiver. The method includes receiving respective signals in each antenna of the multiple antenna receiver and separating each of the signals that were received at each antenna of the multiple antenna receiver into a real part and an imaginary part. The method further includes filtering each of the separated signals in separate filters to cancel interference and supplying outputs from each of the filters. The filter outputs are summed to produce a combined output signal.

In another embodiment, a multiple antenna receiver system is provided that includes a plurality of branches coupled to respective antennas. Each branch has two signal paths for real and imaginary parts of the signal. An adaptive filter/combiner is coupled to the real and imaginary signal paths and generates a combined output signal in which interference has been canceled. The adaptive filter/combiner includes a filter coupled to each signal path in each branch and a summing circuit coupled to sum the signals generated by each filter and generate the combined output signal.

BRIEF DESCRIPTION OF THE DRAWINGS

Reference will now be made in detail to the preferred embodiments of the present invention, examples of which are illustrated in the accompanying drawings, and wherein like reference numerals identify like or similar structures or processes and wherein:

FIG. 3 is a simplified block diagram of a conventional GMSK receiver;

FIG. 4 is a simplified block diagram of a conventional GMSK SAIC receiver;

DESCRIPTION OF THE PREFERRED EMBODIMENT(S)

The exemplary embodiments described herein may be applied to interference cancellation for a wireless downlink channel, i.e., a channel conveying information from a cellular antenna transceiver or base station of a wireless cellular system to a multiple antenna receiver, and to apparatus and methods that may be implemented in a wireless communications terminal, for example, a cellular radiotelephone, wireless capable personal digital assistant (PDA) or similar communications device. Embodiments of the present invention may also be used where multiple receive antennas in a wireless cellular system, e.g., a base station multiple antenna receiver, desire interference cancellation in order to enhance signal quality and capacity. It will be further appreciated, however, that the present invention may be used in other environments, e.g., in other types of wireless applications or in wireless multiple antenna receiver applications in which traditional interference cancellation techniques are not available or ineffective or improvements in interference cancellation are desirable.

This application utilizes various acronyms throughout the specification and drawings. For convenience, unless otherwise set forth in the text, those acronyms are defined as follows:

AFC—Automatic Frequency Correction

AGC—Automatic Gain Control

AWGN—Additive White Gaussian Noise

BPSK—Binary Phase Shift Keying

BTS—Base Transceiver Subsystem (or Base Station)

BER—Bit Error Rate

C/I—Carrier to Interferer Ratio

DDFSE—Delayed Decision Feedback Sequence Estimator

DSP—Digital Signal Processing

EDGE—Enhanced Data rates for Global Evolution

GMSK—Gaussian Minimum Shift Keying

8PSK—8 (Constellation) Phase Shift Keying

GPRS—Generalized Packet Radio System

GSM—Global System for Mobile Communications

LS—Least Squares

JD—Joint Demodulation

IRC—Interference Rejection Combining

MMSE—Minimum Mean Square Error

QPSK—Quaternary Phase Shift Keying

RLS—Recursive Least Squares

SAIC—Single Antenna Interference Cancellation

TDMA—Time Division Multiple Access

TSC—Training Sequence Code

Figure 1:
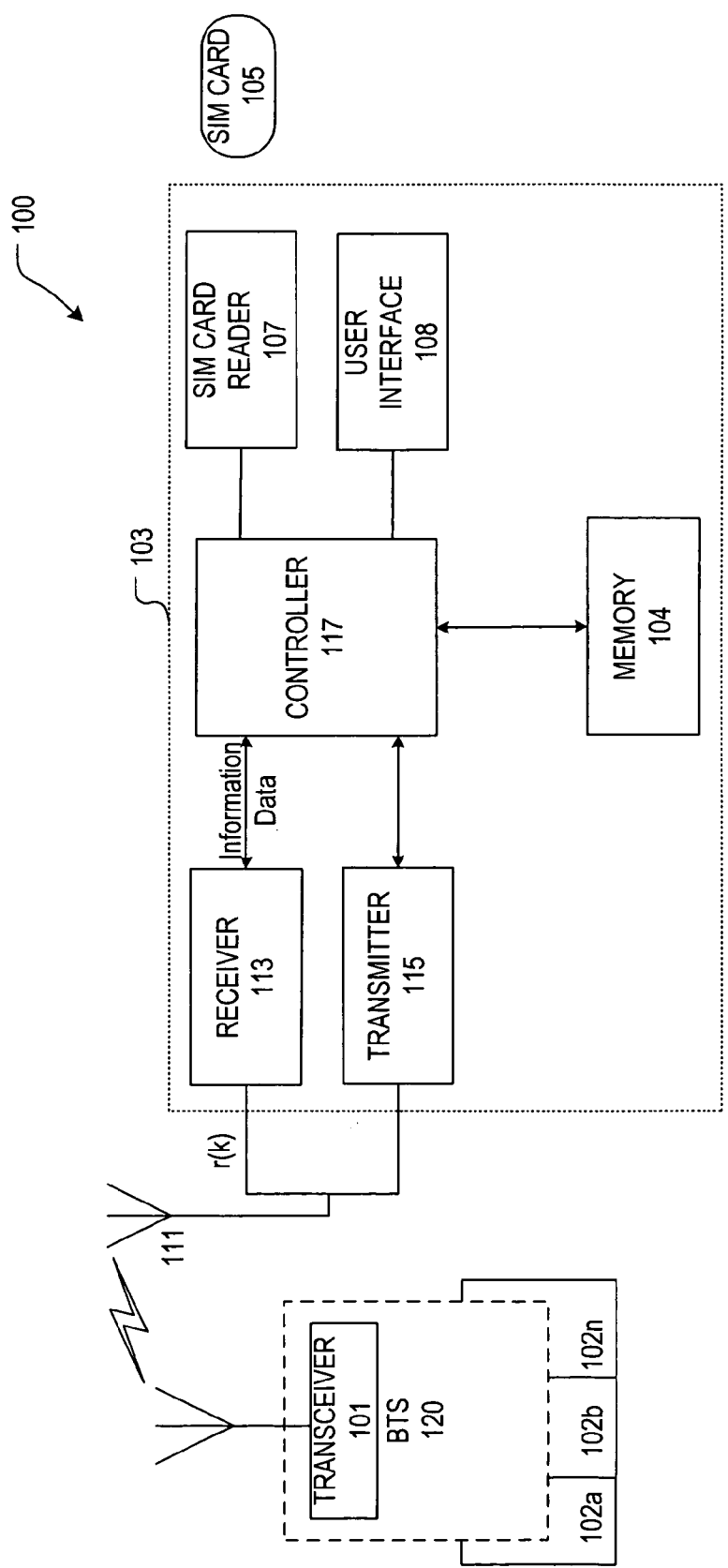
FIG. 1 is a block diagram of a portion of a wireless communication system showing the main functional components of an antenna receiver constructed in accordance with the teachings of the present invention.

FIG. 1 illustrates an exemplary embodiment, in which there is shown a GSM wireless system 100, which employs GMSK modulation for circuit-switched voice and packet-switched data services (GPRS) and is used with a mobile device 103 and cellular antenna transceiver 101. The exemplary mobile device 103 includes transmitter 115, receiver 113, controller 117, memory 104 and SIM card reader 107, user interface 108 and SIM card 105. The present invention may be implemented in any type of mobile telecommunications system, including a GSM/GPRS telecommunications system in which there is a receiver 113 that is subject to interference. Implicit in the adaptability to various types of networks is the adaptability to the various encoding schemes associated with those networks, e.g., GMSK for GSM. The filtering methodology of the present invention is valid for single-valued modulation such as GSMK and BPSK and other single-valued modulation techniques. However, as will be understood by those in the art, modulation schemes such as QPSK and 8-PSK use vector value modulation and hence may not achieve as significant a benefit from the inherent diversity nature of the filter and filtering methodology presented herein.

In the description of an embodiment in which the multiple antenna interference cancellation occurs in the mobile device 103, the cellular antenna transceiver 101 requires no modification from that known in the art and antenna 111 represents multiple antennas. The cellular antenna transceiver 101 is typically operated in sectors 102a, 102b, 102n (generally 102), and may, for example, comprise three sectors per cellular antenna transceiver 101. Each of the sectors transmits to a mobile device 103 in accordance with its own frequency mapping and its own training sequence code (TSC).

Figure 2:
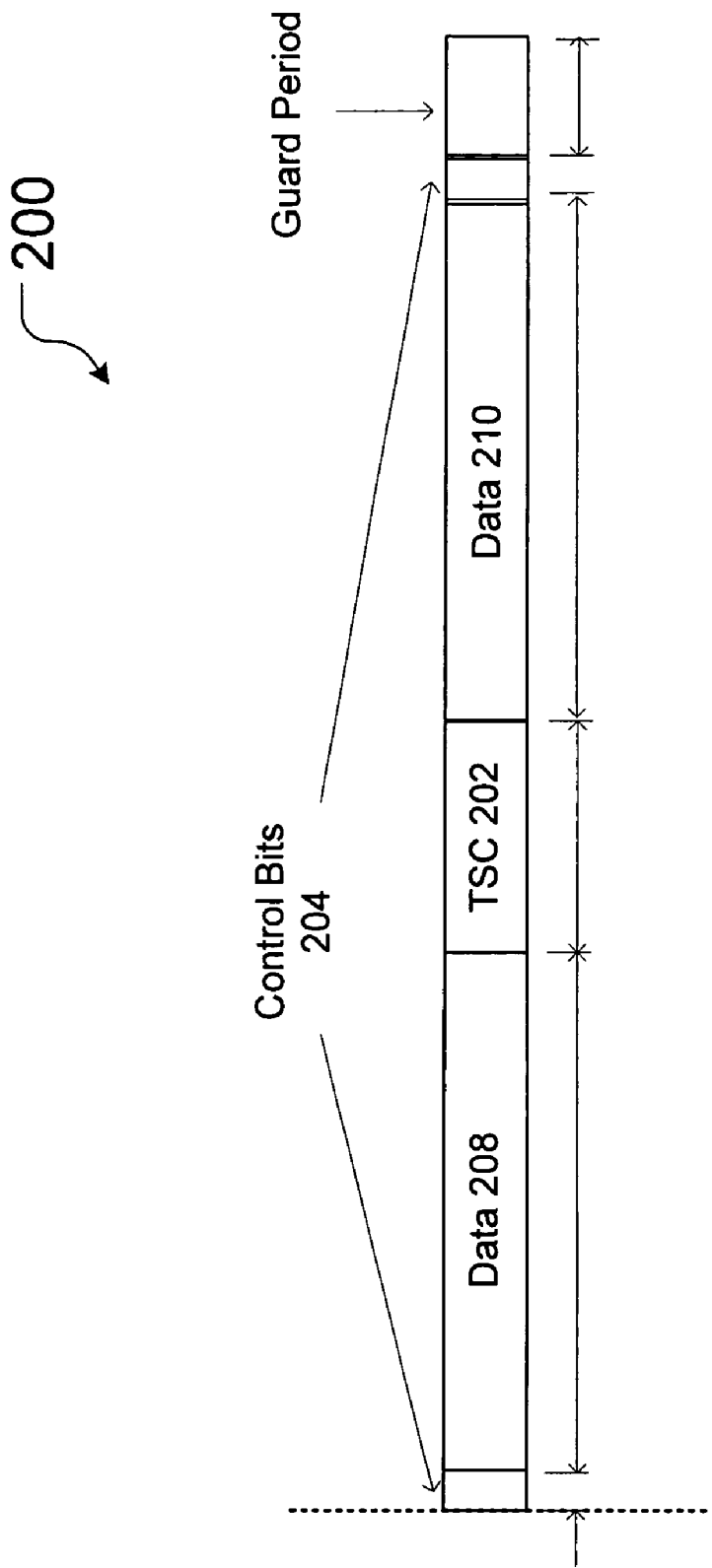
FIG. 2 is an example of a typical GSM data stream in which the Training Sequence Code is shown.

FIG. 2 illustrates a typical transmission burst 2000 from cellular antenna transceiver 101. As illustrated in FIG. 2, the training sequence code (TSC) 202 is a 26 bit code embedded in a transmission burst 200 from cellular antenna transceiver 101 and used as an identifier for all mobile devices 103 in a particular sector 102. A particular TSC 202 is typically assigned to sector 102 or a cell. Since there are a total of 8 TSC codes, cells within the network reuse TSC codes. In a typical GSM configuration, each cellular antenna transceiver 101 transmits a burst every 4.615 milliseconds, or over 200 bursts per second. The TSC 202 may be embedded in the middle of the transmission burst 200 along with control (tail) bits 204 and data bits 208, 210 in accordance with system design and/or industry standards. In a hand-off to the next antenna, the TSC 202 parameter for the new sector 102 is conveyed to the mobile device 103 along with the assigned frequency and time slot. As such, the TSC 202 is a known parameter in any mobile telecommunications system 100 and all types of mobile devices 103 are capable of identification thereof.

To help understand the invention, the processing associated with a GSM GMSK receiver with one antenna, a GSM SAIC receiver with one antenna, and a GSM receiver with two antennas using receive diversity, is described below.

The baseband signal processing associated with a conventional receiver having a single antenna used in a GMSK for GSM environment is shown in FIG. 3. As shown in FIG. 3, the effective baseband output from the antenna is input to a receive (RX) filter and front-end processor 300. The front end processor uses techniques for signal conditioning that are typically known in the art, such as calculating channel estimates and Doppler frequencies, and synchronization. The RX filter is typically a low pass filter, which limits the noise and the adjacent channel interference that may be present. The output of the filter is then input to the front-end processor 300, which typically includes functionality to support Automatic Frequency Control (AFC), Automatic Gain Control (AGC), symbol synchronization, and signal de-rotation. The signal de-rotation acts directly on the filtered signal by multiplying it by $j^{-k}$, where j=square root of −1, and k is the symbol number.

The signal de-rotation operation allows the resulting signal to be expressed as the convolution of the transmitted symbol stream expressed as a series of +−1 levels with the effective channel response, which includes the GMSK transmit filter, the actual channel, the RX filter, and the effect of multiplying by $j^{-k}$. The fact that the transmitted symbols take on only +−1 values greatly simplifies the processing in the following equalizer 305. If the signal de-rotation operation were not performed, the transmitted symbols would alternate between either +−1 or +−j, which complicates processing in the equalizer 305. The de-rotated signal, which is output from the front-end processor 300, is then input to the equalizer 305, which develops symbol estimates, in both hard and soft formats. These symbol estimates are used by additional processing methods in the equalizer 305, to develop estimates of the transmitted source bits.

The baseband signal processing associated with a conventional SAIC receiver is shown in FIG. 4. As shown in the figure, the output of the receive (RX) filter and front-end processor block 400, which is a de-rotated GMSK signal is now split into its real and imaginary parts 401 and 402, respectively to produce two virtual paths. Each of the paths 401 and 402 contain the transmitted symbol stream convolved with either the real part 401 of the effective channel impulse response multiplied by j raised to the appropriate power, or the imaginary part 402 of the same quantity. The amount of correlation between the paths 401 and 402 is controlled by the amount of correlation between the channel impulse response coefficients. The two paths 401 and 402 are then input to a combiner 404, which cancels the interference. The output of the combiner 404 is then input to equalizer 405.

Figure 5:
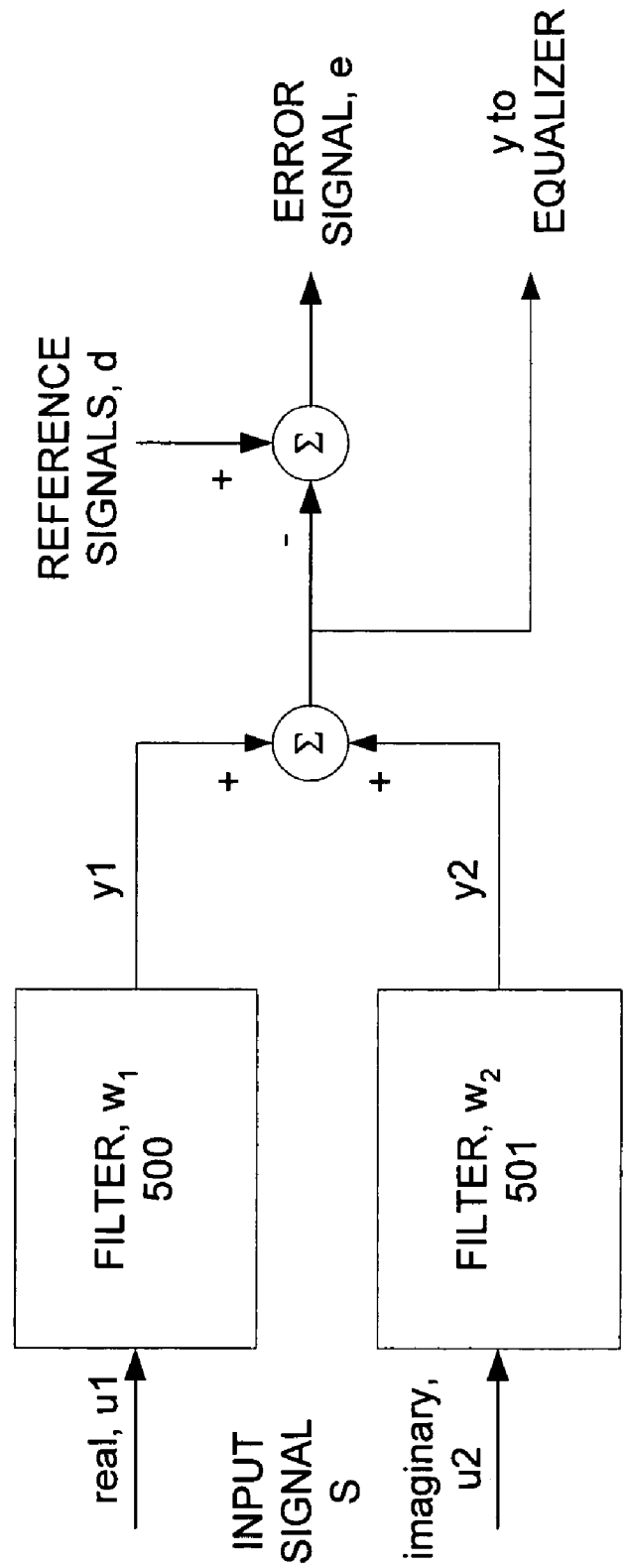
FIG. 5 is a simplified block diagram of a combiner for a SAIC receiver.

A simplified block diagram of the combiner 404 is shown in FIG. 5. The combiner 404 includes two filters, $w_1$ (500) and $w_2$ (501), the weights (coefficients) of which are suitably adjusted to cancel as much interference as possible, using conventional weighting calculations. The real part ($u_1$) of the de-rotated signal (from the path 401) is input to filter $w_1$ (500) and the imaginary part ($u_2$) (from the path 402) is input to $w_2$ (501). The outputs of the filters ($y_1$ and $y_2$) are then summed to produce the combined signal, y, which is sent to the equalizer 405. Also shown is the development of an error signal, e, which is formed by subtracting the output signal, y from the reference signal d. The reference signal d may be derived from the training sequence code. The error signal can be used in tracking algorithms, which adaptively update the filter weights. The initial weight values are calculated based on a certain signal processing criteria.

Two of the more popular signal processing criteria are Zero Forcing (ZF) and Minimum Mean Squared Error (MMSE). Of the two, MMSE is preferred since it provides better performance in the presence of Additive White Gaussian Noise (AWGN). In MMSE processing the weights are adjusted such that the expectation of the square of the error signal is minimized. The resulting optimum weight vector is given by $w_o = R^{-1} p$ where R is the input signal correlation matrix, and p is the cross-correlation vector between the input and the reference signal, d. Note that vectors are identified as bold type, lower case letters, and matrices as bolt-type, upper case letters. The resultant filter is often referred to as a Weiner filter. In practice however, one may not typically develop the expectation or ensemble average of the square of the error signal as required by strict MMSE processing.

Alternatively, time-averages are used based on a finite number of input samples, where now minimizing the sum of the squared error becomes the objective. This latter technique is commonly referred to as the method of Least Squares (LS), and leads to a weight vector defined by $w = \Phi^{-1} z$, where $\Phi$ is the time-averaged correlation matrix of the input signal, and z is the time-averaged cross-correlation vector of the input and the reference signal. LS processing is typically defined for a single filter input. However, this method is also applicable to combining multiple signals and filters, as later discussed in further detail.

Referring again to FIG. 5, the combined signal (y) after filtering is given by:

$$y(i) = y_1(i) + y_2(i) = \sum_{k=0}^{M-1} w_{1k} u_1(i-k) + \sum_{k=0}^{M-1} w_{2k} u_2(i-k), \quad (1)$$

where i is the ith sample of the signal, $w1k$, $w2k$ are the kth filter coefficients of each of the respective filters, and M is the number of taps of each filter. Note that the equation is written herein without the traditional complex conjugates, which in some derivations are applied to each of the filter coefficients. The error signal, e, is then given by:

$$e(i) = d(i) - y(i) = d(i) - \left[ \sum_{k=0}^{M-1} w_{1k} u_1(i-k) + \sum_{k=0}^{M-1} w_{2k} u_2(i-k) \right]. \quad (2)$$

In LS processing the tap weights of the filters $w_1$ and $w_2$ are chosen to minimize a cost function that consists of the sum of the errors squared:

$$\xi = \sum_{i=M}^{N} |e(i)|^2 = \sum_{i=M}^{N} e(i) e^*(i), \quad (3)$$

where N is the total number of sample points, and the limits on the index i have been chosen in such a way that for each value of i, all the M tap inputs of the filters have non-zero values. For this special case of real input signals ($u_1$), the cost function reduces to a summation over i of $e^2(i)$. The partial derivative of the cost function is now taken with respect to $w_{1k}$ and $w_{2k}$. The results are set to zero, and the weights determined. Mathematically, this can be written as:

$$\nabla_{1k} = \frac{\partial \xi}{\partial w_{1k}} = 0; \quad (4a)$$

$$\nabla_{2k} = \frac{\partial \xi}{\partial w_{2k}} = 0; \quad (4b)$$

The partial derivatives of the cost function are also referred to as the gradient vectors, and are obtained by substituting (2) into (3), and then taking the partial derivatives to give $$\nabla_{1k} = -2 \sum_{i=M}^{N} e(i) u_1(i-k); \quad (5a)$$

$$\nabla_{2k} = -2 \sum_{i=M}^{N} e(i) u_2(i-k); \quad (5b)$$

A system of 2M simultaneous equations can then be obtained by substituting the expression for e(i) into (5a) and (5b), setting the expressions to zero, and rearranging the terms as follows:

$$\sum_{i=M}^{N} d(i) u_1(i-k) = \quad (6a)$$
$$\sum_{t=0}^{M-1} w_{1t} \sum_{i=M}^{N} u_1(i-t) u_1(i-k) + \sum_{t=0}^{M-1} w_{2t} \sum_{i=M}^{N} u_2(i-t) u_1(i-k)$$

$$\sum_{i=M}^{N} d(i) u_2(i-k) = \quad (6b)$$
$$\sum_{t=0}^{M-1} w_{1t} \sum_{i=M}^{N} u_1(i-t) u_2(i-k) + \sum_{t=0}^{M-1} w_{2t} \sum_{i=M}^{N} u_2(i-t) u_1(i-k)$$

where the variable t has been introduced as a dummy summation index. One can simplify (6a) and (6b) by defining two terms: the time averaged autocorrelation function, $\phi(k,t)$, of the input signals, and the time-averaged cross-correlation function, $z(-k)$, of the input signals and the reference signal. These terms are given by $$\phi_{mn}(k, t) = \sum_{i=M}^{N} u_m(i-k) u_n(i-t) \quad (7)$$

$$z_m(-k) = \sum_{i=M}^{N} u_m(i-k) d(i) \quad (8)$$

where m, n=1 or 2. Making use of (7) and (8) we can rewrite (6a) and (6b) as $$z_1(-k) = \sum_{t=0}^{M-1} w_{1t} \phi_{11}(k, t) + \sum_{t=0}^{M-1} w_{2t} \phi_{12}(k, t) \quad (9a)$$

$$z_2(-k) = \sum_{t=0}^{M-1} w_{1t} \phi_{21}(k, t) + \sum_{t=0}^{M-1} w_{2t} \phi_{22}(k, t) \quad (9b)$$

where as before k, t=0, 1, . . . , M−1. We can now rewrite (9a) and (9b) in matrix form by first introducing the following three definitions. First, the M×M time-averaged correlation matrix of the input signals described by indices m and n=1,2 is given by $$\Phi_{mn} = \begin{bmatrix} \varphi_{mn}(0,0) & \varphi_{mn}(1,0) & \cdots & \varphi_{mn}(M-1,0) \\ \varphi_{mn}(0,1) & \varphi_{mn}(1,1) & \cdots & \varphi_{mn}(M-1,1) \\ \vdots & \vdots & \ddots & \vdots \\ \varphi_{mn}(0,M-1) & \varphi_{mn}(1,M-1) & \cdots & \varphi_{mn}(M-1,M-1) \end{bmatrix} \quad (10)$$

Second, the M×1 time-averaged cross-correlation vector of the input signals and the reference signal described by the index m=1,2 is given by $$z_m = [z_m(0), z_m(-1), \ldots, z_m(-M+1)]^T \quad (11)$$

And finally, the M×1 filter weight vector described by the index m=1,2 is given by $$w_m = [w_{m0}, w_{m1}, \ldots, w_{m(M-1)}]^T \quad (12)$$

Making use of (10), (11), and (12) we can now rewrite (9a) and (9b) and the time averaged cross correlation function, z(−k) can be expressed as the vector:

$$z = \Phi w \quad (13)$$

where z is a 2M×1 vector developed by arranging the $z_m$ vectors as follows:

$$z = [z_1 z_2]^T \quad (14)$$

and is a 2M×2M matrix developed by arranging the $\Phi_{mn}$ matrices as follows:

$$\Phi = \begin{bmatrix} \Phi_{11} & \Phi_{32} \\ \Phi_{21} & \Phi_{22} \end{bmatrix} \quad (15)$$

and w is a 2M×1 vector developed by arranging the $w_m$ vectors as follows:

$$w = [w_1 w_2]^T \quad (16)$$

Finally, using (13) we can obtain the desired weight vector as:

$$w = \Phi^{-1} z \quad (17)$$

Equation (17) is the LS counterpart to the solution of the matrix form of the Weiner-Hopf equations, and states that the weight vector of a combination (summation) of linear LS filters is given by the product of the inverse of the time-averaged correlation matrix, Φ of the filter inputs, and the time-averaged cross-correlation vector, z between the filter inputs and the reference signal, d.

Assuming the normal GSM burst format, as shown in FIG. 2, the initial weight values are calculated over that portion of the burst corresponding to the known Training Sequence Code (TSC), which is inserted in the middle of each burst beginning at symbol number 62 and ending at symbol 87. Thus, accounting for the LS filter delays=M−1, the summation indices to be used in (8) and (9) are 62+M−1 to 87+M−1. The initial weight values can then be updated over the remainder of the burst by employing a suitable tracking algorithm such as a Least Mean Square (LMS) or Recursive Least Square (RLS) algorithm based on either a "sliding" or "growing" window of known TSC symbols plus estimates of unknown symbols provided by the equalizer 405. Alternatively, one can recalculate the weights based on the LS criteria using the known, and estimates of the unknown symbols.

The above implementation of a SAIC receiver is attractive from a number of perspectives. One advantage is that it is "blind" in the sense that it does not need to estimate the channel of the interferer, which can be problematic, and especially difficult in asynchronous GSM networks. The other main type of SAIC receiver, commonly referred to as a Joint Demodulation (JD) or a Joint Detection receiver, attempts to jointly demodulate both the desired signal and one or more interferers, and thus, must estimate the channel of the interferer. This latter approach typically gives rise to a more complex implementation. Another advantage of this particular blind receiver is that the existing conventional receiver equalizer can be used without modification, which reduces the overall cost and complexity. The JD SAIC receiver on the other hand requires a new, dedicated equalizer. This is also true of some blind techniques such as Interference Rejection Combining (IRC), which also require changes to the existing equalizer. A third advantage of the blind SAIC receiver described herein is that the combiner processing required is fairly simple, comprising a matrix inversion, and a matrix-vector multiply to determine the weights. Simulations have shown that filters with 4 to 5 taps are optimal, and thus, with that number of taps, the matrix to be inverted is at the most a 10×10 matrix. Since in the limit, the Φ matrix becomes Toeplitz, efficient computational techniques based on the Levinson-Durbin algorithm can be used to calculate the inverse. In addition, all of the input values are real valued, which also simplifies the processing.

With regards to performance, simulation results in the presence of a single, synchronous co-channel interferer with continuous random data indicate that there is sufficient de-correlation between the two virtual paths to provide approximately 11 dB of gain over a conventional GMSK receiver. This gain was achieved for a Typical Urban channel model at 3 km per hour vehicle speed (TU3) with ideal Frequency Hopping (FH) and a 4% Bit Error Rate (BER) comparison point. The front-end, low pass filter 3 dB bandwidth was set to 100 kHz, and the equalizer 730 was a 4-state Delayed Decision Feedback Sequence Estimator (DDFSE) with a total memory order, Lh=4. LS processing was used to initially set the filter weights, and also updates the weights once every 10 symbols during the data portion of the GSM burst. The LS processing provides almost complete cancellation of a single interferer, but performance will degrade in the presence of multiple interferers. It is also important to note, that this receiver does not provide any gain in noise-limited conditions. This in contrast to the two-antenna, receive diversity receiver described below, which can provide gains in noise-limited conditions. The reason for this is that in the SAIC receiver the desired signal and interference traverse two different channels, thus supporting some amount of interference cancellation. The desired signal component in each of the two virtual paths is derived from the same channel and thus, there is no diversity to be exploited in noise-limited conditions as with the two-antenna approach.

Figure 6:
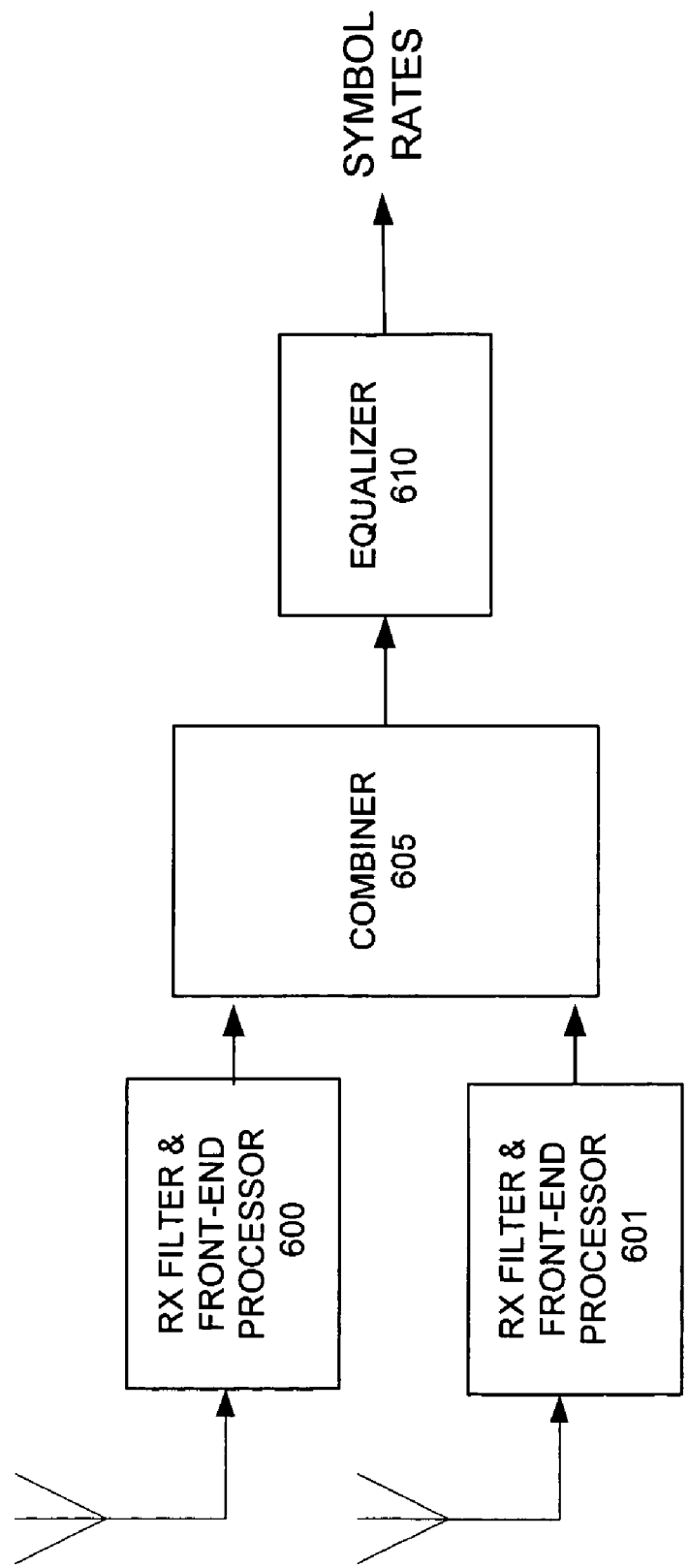
FIG. 6 is a simplified block diagram of a two-antenna/receive diversity receiver.

The baseband signal processing associated with the two-antenna, receive diversity receiver is shown in FIG. 6. As shown in the figure, the effective baseband output from each of the antennas is input to its own receive filter and front-end processor blocks 600 and 601. The complex, de-rotated signal developed by the front-end processing is then input to the combiner 605, which cancels the interference. The output of the combiner 605 is then input to the equalizer 610. The block diagram of the combiner 605 is identical to that of the SAIC combiner shown in FIG. 5. Again, ZF, MMSE/LS or some other relevant signal processing technique can be used to adjust the weights of the filters. One main difference that is not present in the SAIC combiner is that the inputs are complex signals instead of real signals. Thus, some of the previously defined equations need to be suitably modified. In particular (5a) and (5b) are modified as follows $$\nabla_{1k} = -2 \sum_{i=M}^{N} e(i) u_i * (i-k); \quad (18a)$$

$$\nabla_{2k} = -2 \sum_{i=M}^{N} e(i) u_2 * (i-k); \quad (18b)$$

These changes to the gradient vectors cause (7) and (8) to be modified as follows:

$$\phi_{mn}(k, t) = \sum_{i=M}^{N} u_m * (i-k) u_n(i-t) \quad (19)$$

$$z_m(-k) = \sum_{i=M}^{N} u_m * (i-k) d(i) \quad (20)$$

Note that equations (6a) and (6b) are modified as well, but not shown herein. The remaining equations used to ultimately solve for the weight vector(s) are unchanged.

Simulation results for the two-antenna receive diversity receiver indicate a gain of approximately 33 dB over the conventional receiver at the 4% BER point for the same set of channel conditions assumed above. LS processing with adaptation was used to adjust the filter weights within the combiner 605. The optimal number of filter taps for this receiver was found to be four, which implies an 8×8 $\Phi$ matrix. In addition, the two antenna paths were assumed to be identically and independently distributed (i.i.d), and thus, the gain achieved is the maximum possible. The gain will decrease for increasing levels of correlation between the two antennas, and as the number of interferers increase. It is important to note, that this receiver will also provides link gain for noise-limited conditions as opposed to the SAIC receiver, which only provides gain in interference-limited environments. For noise-limited operation with sufficiently de-correlated inputs, the MMSE/LS processing reduces to Maximal Ratio Combining (MRC), which is known to provide significant gains.

Figure 7:
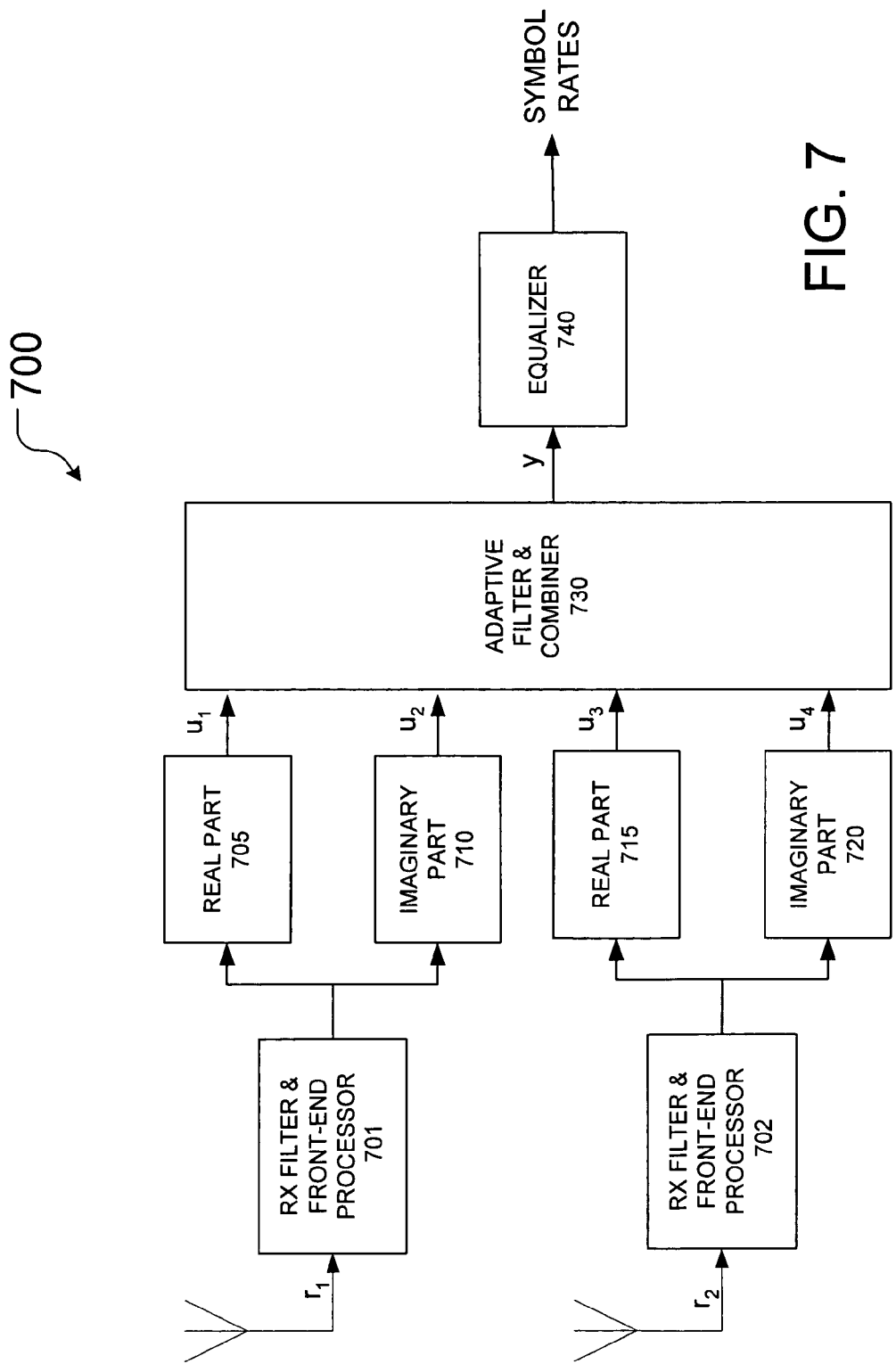
FIG. 7 is a simplified block diagram of the SAIC plus Two receive diversity receiver.

According to an embodiment of the invention, the SAIC receiver and two-antenna, receive diversity receiver described above are combined to produce what is referred to herein as a "SAIC plus Two" receiver. The signal processing associated with the SAIC plus Two receiver 700 is shown in FIG. 7. As shown in the figure, the processing up to the output of the receiver filter and front-end processors 701, 702 is identical to the two-antenna, receive diversity receiver. One readily apparent feature over conventional receivers is that the complex, de-rotated GMSK outputs developed by the front-end processors 701 and 702 are split into their respective real ($u_1$ and $U_3$) and imaginary ($u_2$ and $u_4$) parts, thus producing a total of four signal paths 705, 710, 715, and 720. These four signals ($u_1$, $u_2$, $u_3$ and $u_4$) are then input to the adaptive filter/combiner 730, which cancels the interference present in the signals. The output (y) of the adaptive filter/combiner 730 is then input to the equalizer.

Figure 8:
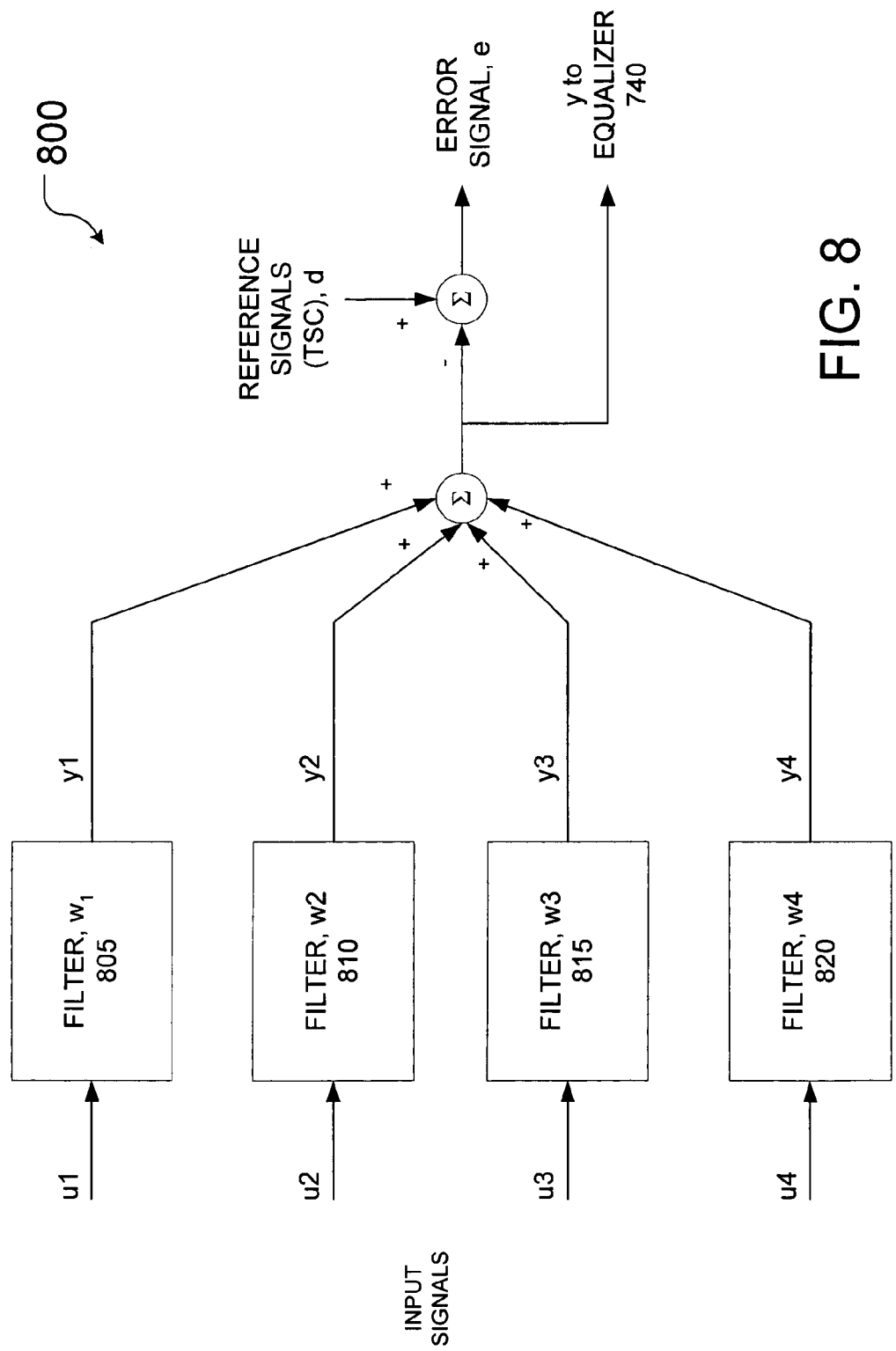
FIG. 8 is a simplified block diagram of a combiner used in the SAIC plus Two receive diversity receiver.

The combiner portion of the adaptive filter/combiner 730 for the SAIC plus Two receiver 700 is an expanded version of the two-input combiner used for the SAIC receiver, shown in FIG. 6. A simplified block diagram of the adaptive filter/combiner 730 is shown in FIG. 8. The real and imaginary parts of the two complex, de-rotated GMSK signals are now input to four separate filters, $w_1$ thru $w_4$, the outputs of which ($y_1$, $y_2$, $y_3$ and $y_4$) are combined (summed) to produce the combiner output, y. The combiner output, y is then input to the equalizer 740. The error signal, e is formed by subtracting the combiner output, y from the reference signal (TSC), d. ZF, MMSE/LS, or some other suitable signal processing routine may once again be used to initially set the filter weights. One preferred method is MMSE/LS processing as described below.

The following provides a detailed description of the LS processing as it applies to an embodiment of the invention. The combiner output (y) is given by:

$$y(i) = \sum_{k=0}^{M-1} w_{1k} u_1(i-k) + \sum_{k=0}^{M-1} w_{2k} u_2(i-k) + \sum_{k=0}^{M-1} w_{3k} u_3(i-k) + \sum_{k=0}^{M-1} w_{4k} u_4(i-k) \quad (21)$$

This implies that the error signal is given by $$e(i) = d(i) - \left[ \sum_{k=0}^{M-1} w_{1k} u_1(i-k) + \sum_{k=0}^{M-1} w_{2k} u_2(i-k) + \sum_{k=0}^{M-1} w_{3k} u_3(i-k) + \sum_{k=0}^{M-1} w_{4k} u_4(i-k) \right] \quad (22)$$

The cost function is still the same as defined by (3), but now there are four gradient vectors, which must be set to zero and solved. The gradient vectors are given by $$\nabla_{pk} = -2 \sum_{i=M}^{N} e(i) u_p(i-k) \text{ where } p = 1, 2, 3, 4 \quad (23)$$

A system of 4M simultaneous equations is then obtained by substituting (22) into (23) for each of the four values of p, and setting the resulting expressions to zero. In general one can write the M simultaneous equations for a given value of p as follows:

$$\sum_{i=M}^{N} d(i) u_p(i-k) = \sum_{t=0}^{M-1} w_{1t} \sum_{i=M}^{N} u_1(i-t) u_p(i-k) + \sum_{t=0}^{M-1} w_{2t} \sum_{i=M}^{N} u_2(i-t) u_p(i-k) + \sum_{t=0}^{M-1} w_{3t} \sum_{i=M}^{N} u_3(i-t) u_p(i-k) + \sum_{t=0}^{M-1} w_{4t} \sum_{i=M}^{N} u_4(i-t) u_p(i-k) + \quad (24)$$

One can simplify (24) by making use of (7) and (8), and setting m=p, and n=1,2,3,4 as follows:

$$z_p(-k) = \sum_{t=0}^{M-1} w_{1t} \phi_{p1}(k, t) + \sum_{t=0}^{M-1} w_{2t} \phi_{p2}(k, t) + \sum_{t=0}^{M-1} w_{3t} \phi_{p3}(k, t) + \sum_{t=0}^{M-1} w_{4t} \phi_{p4}(k, t) \quad (25)$$

One can now rewrite (25) for p=1,2,3,4 in matrix form by making use of the time-averaged correlation matrices (10), the time-averaged cross-correlation vectors (11), and the individual filter weight vectors (12), and by setting m=p and n=1,2,3,4. Equation (13) z=Φw is still valid with the following new definitions for z, Φ, and w: z is a 4M×1 vector developed by arranging the $z_m$ vectors as follows $$z=[z_1 z_2 z_3 z_4]^T \quad (26)$$

Φ is a 4M×4M matrix developed by arranging the $\Phi_{mn}$ matrices as follows:

$$\Phi = \begin{bmatrix} \Phi_{11} & \Phi_{12} & \Phi_{13} & \Phi_{14} \\ \Phi_{21} & \Phi_{22} & \Phi_{23} & \Phi_{24} \\ \Phi_{31} & \Phi_{32} & \Phi_{33} & \Phi_{34} \\ \Phi_{41} & \Phi_{42} & \Phi_{43} & \Phi_{44} \end{bmatrix}, \quad (27)$$

and w is a 4M×1 vector developed by stacking the $w_m$ vectors as follows:

$$w=[w_1 w_2 w_3 w_4]^T \quad (28).$$

The composite weight vector w can then be solved by using (17).

For the GSM application at hand, the weights can be initially determined based on input signals from the TSC portion of the burst. Once the initial weights are set, adaptive processing can be employed to update the weights using either LMS or RLS tracking algorithms. Alternatively, LS processing can be applied to update the weights as well. The reference signal for tracking may be a combination of the TSC and estimated data symbols provided by an equalizer.

Simulation results for an exemplary SAIC plus two receiver indicate a gain of approximately 50 dB over the conventional receiver at the 4% BER point for the same set of channel conditions assumed above. LS processing with adaptation is used to adjust the filter weights within the combiner. The optimal number of filter taps for this receiver was found to be four, which implies a 16×16 Φ matrix. As mentioned previously, the inverse of Φ can be calculated efficiently by exploiting the Toeplitz nature of the matrix using the Levinson-Durbin algorithm. In addition, the two antenna paths were assumed to be completely independent (i.i.d), and thus, the gain achieved is the maximum possible. The gain will decrease for increasing levels of correlation between the two antennas, and as the number of interferers increase.

Figure 9:
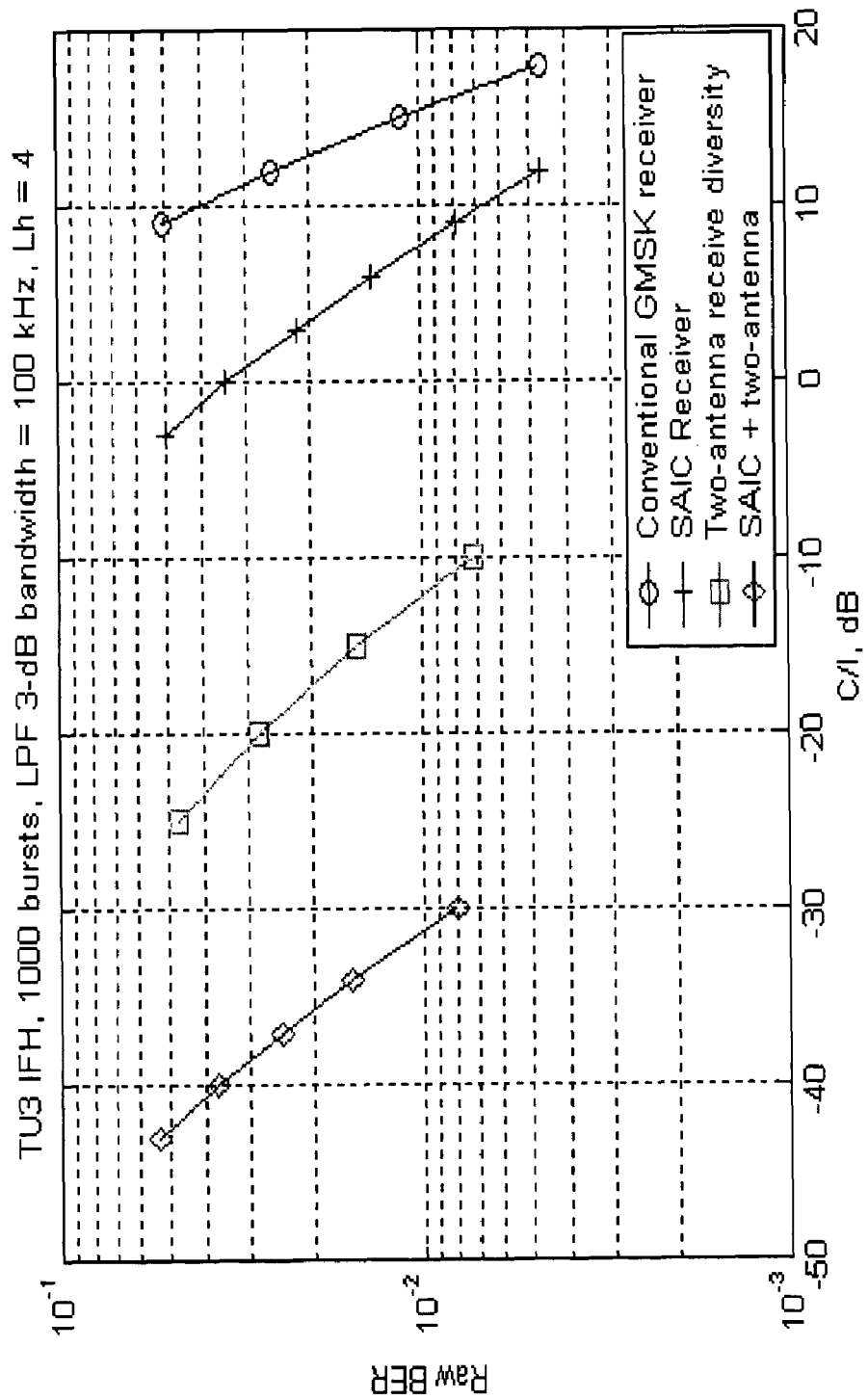
FIG. 9 is a graph showing results obtained from numerical modeling of the techniques developed as part of the present invention.

FIG. 9 illustrates the expected BER performance gain of the invention as a function of the Carrier-to-Interference (C/I) ratio, for the GSM TU3 channel model with ideal FH. The performance of the conventional, SAIC, and two-antennas with receive diversity receivers are also shown for comparison. The gains noted above over the conventional receiver can be read off the curves by comparing the C/Is required to support a 4% BER operating.

The invention can be extended to include more than just two receive antennas, but for mobile terminals this may be the current upper practical limit. For base stations, four antennas is a distinct possibility since polarization diversity could be applied to two spatially separated antennas to produce four effective antenna paths. Combining this with a SAIC receiver would give a total diversity order of 4×2=8. At some point, the link gain saturates with increasing diversity order, and thus, one would have to determine if there is sufficient additional gain to justify four antenna paths.

Figure 10:
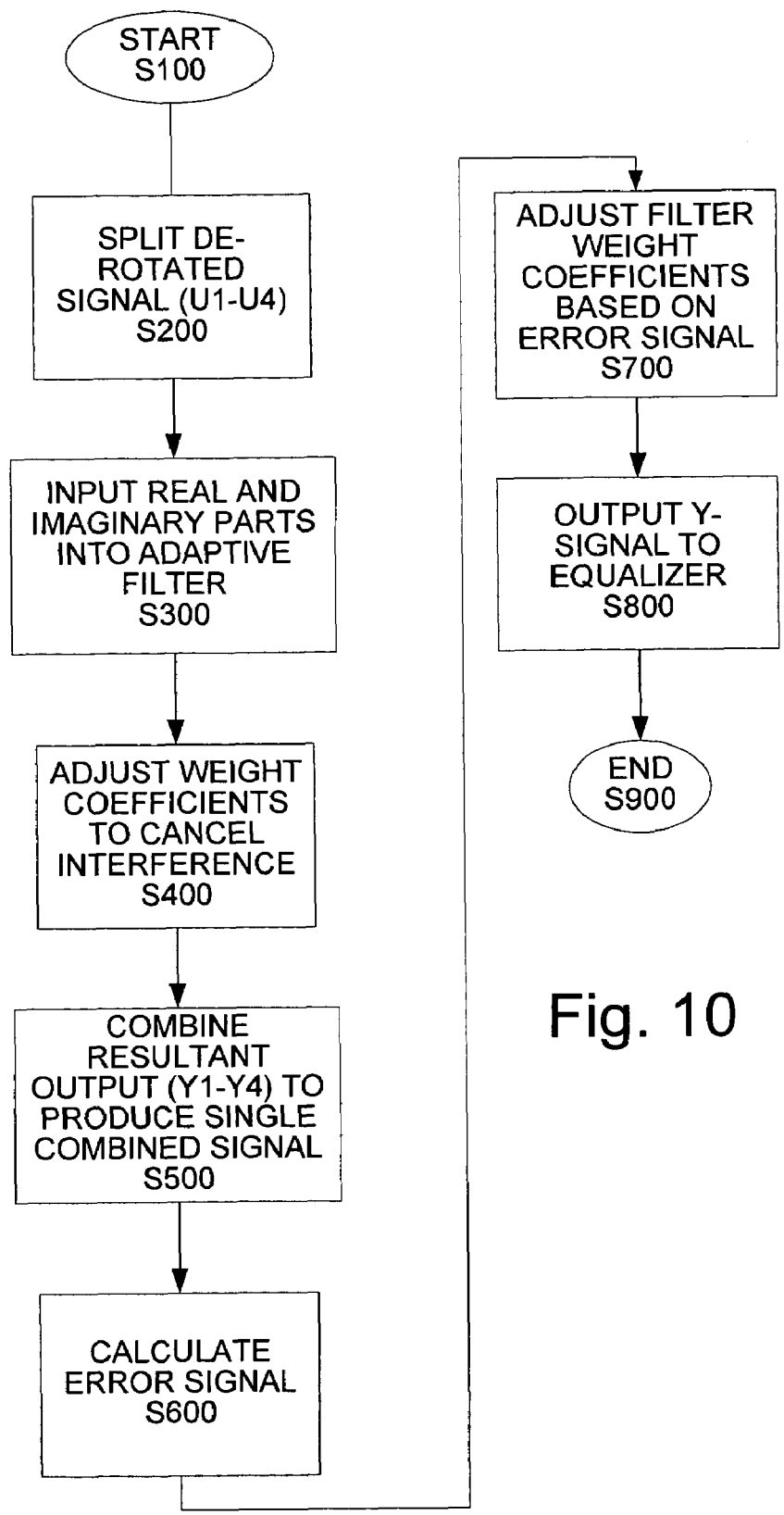
FIG. 10 is a block diagram illustrating the interference cancellation methods described herein.

FIG. 10 is a block diagram illustrating the methods employed by the exemplary method for interference canceling, according to this invention. The method begins at step S100 and proceeds to step S200 wherein a de-rotated signal received from a front-end processor is split into real and imaginary parts ($u_1$-$u_4$). The process continues to step S300.

At step S300, the real and imaginary parts are input into separate adaptive filters. The process then continues to step S400, wherein the weighting coefficients of the adaptive filters are adjusted to cancel interference present in the real and imaginary parts. The process continues to step S500.

At step S500, the real measurements ($y_1$-$y_4$) of the signals output from the adaptive filters are summed to produce the combined output (y). Simultaneously, step S600 is performed, wherein the error signal (e) is calculated. The error signal (e) is calculated by comparing the combined output (y) and the TSC. The process then continues to step S700.

At step S700, the error signal is used to adjust the adaptive filter coefficients, as discussed above.

Finally, at step S800 the combined output is sent to the equalizer for developing soft output values, etc. The process ends at step S900.

The invention as embodied herein has been applied to the voice channel as an example. Those skilled in the art will recognize that the techniques and processes of the present invention may be used in other parts of a cellular system and applied to other types of wireless devices. For example, other modes of operation may include: 1) interference cancellation for all logical traffic channels (TCH) and associated control channels (ACCH) of a wireless network; 2) employing the embodiments disclosed herein (interference cancellation) for the ACCH channel and not the traffic channel, which is typically the case when operating in robust lower speech codec mode (4.75 kbps and 5.9 kbps speech codec for the full-rate mode of the Adaptive Multi-Rate (AMR) vocoder) and the signaling is not as robust; and 3) employing the embodiments disclosed herein (interference cancellation) for TCH and not ACCH, which is typically the case when operating in less robust speech codec mode such as 12.2 kbps and the signaling is relatively robust.

Other embodiments of the invention will be apparent to those skilled in the art from consideration of the specification and practice of the invention disclosed herein. While the present invention has generally been described in terms of cellular mobile radio telecommunications systems, the invention is applicable across a broad range of applications and devices wherein single or multiple antennas receive signals that are susceptible to various types of interference, such as residential-type 802.11 applications. It is intended that the specification and embodiments described herein be considered as exemplary only, with a true scope and spirit of the invention being indicated by the following claims.

What is claimed is:

1. A method for reducing interference in a multiple antenna receiver comprising:

receiving signals in each antenna of the multiple antenna receiver;

separating each of the signals that were received at each antenna of the multiple antenna receiver into a real part and an imaginary part;

filtering each of the separated signals in separate filters to cancel interference and supplying outputs from each of the filters;

summing the filter outputs to produce a combined output signal;

initially determining filter coefficients in each of the filters utilizing an error signal determined according to a difference of the combined output signal and a reference signal, the reference signal being derived from a training sequence code portion of a communication burst; and wherein the filter coefficients are initially determined according to a weight vector given by a product of an inverse of a time-averaged correlation matrix, Φ, of the separated signals, and a time-averaged cross-correlation vector, z, between the separated signals and the reference signal.

2. The method as recited in claim 1 wherein Φ is a matrix sized to be an rM×rM matrix where r is twice a number of antennas in the multiple antenna receiver and M is a number of filter taps.

3. The method as recited in claim 2 wherein z is an rM×1 vector.

4. The method as recited in claim 1 further comprising utilizing adaptive processing to update the filter coefficients.

5. The method as recited in claim 4 wherein the adaptive processing utilizes one of a Least Mean Square (LMS) and Recursive Least Square (RLS) tracking algorithm.

6. The method as recited in claim 1 further comprising utilizing Minimum Mean Square Error/Least Squares (MMSE/LS) processing to update the filter coefficients.

7. A method for reducing interference in a multiple antenna receiver comprising:
   receiving signals in each antenna of the multiple antenna receiver;
   separating each of the signals that were received at each antenna of the multiple antenna receiver into a real part and an imaginary part;
   filtering each of the separated signals in separate filters to cancel interference and supplying outputs from each of the filters;
   summing the filter outputs to produce a combined output signal; and
   wherein the multiple antenna receiver includes a first and second antenna and the combined output signal is produced in accordance with the following equation:

$$y(i) = \sum_{k=0}^{M-1} w_{1k} u_1(i-k) + \sum_{k=0}^{M-1} w_{2k} u_2(i-k) + \sum_{k=0}^{M-1} w_{3k} u_3(i-k) + \sum_{k=0}^{M-1} w_{4k} u_4(i-k)$$

where: i is an $i^{th}$ signal sample; $w_{1k}$, $w_{2k}$, $w_{3k}$, $w_{4k}$ are kth filter coefficients of each of the respective filters; and M is a number of taps of each filter, and $u_1$ is a real part and $u_2$ an imaginary part of a first separated signal derived from a signal received by the first antenna, and $u_3$ is a real part and $u_4$ is an imaginary part of a second separated signal derived from a signal received in the second antenna.

8. A multiple antenna receiver system, comprising:
   a plurality of branches coupled to respective antennas;
   two signal paths for each branch corresponding to the real and imaginary parts of each branch;
   an adaptive filter/combiner coupled to the signal paths and configured to generate a combined output signal in which interference has been canceled;
   wherein the adaptive filter/combiner further comprises respective filters coupled to each signal path in each branch and a summing circuit coupled to sum the signals generated by each filter and generate the combined output signal; and
   wherein a series of filter coefficients contained in each filter are adjusted to cancel interference; and
   wherein the filter coefficients are initially determined according to a weight vector given by the product of an inverse of a time-averaged correlation matrix, Φ, of the real and imaginary parts of each branch, and the time-averaged cross-correlation vector, z, between the real and imaginary parts of each branch and the reference signal.

9. The system as recited in claim 8 wherein Φ is a matrix sized to be an rM×rM matrix where r is twice a number of antennas in the multiple antenna receiver and M is a number of filter taps.

10. The system as recited in claim 9 wherein z is an rM×1 vector.

11. The system of claim 8 further comprising an equalizer coupled to receive the combined output signal.

12. The system of claim 8 further comprising an error signal generator coupled to receive the combined output signal and a reference signal and generate an error signal according to a difference between the combined output signal and the reference signal.

13. The system of claim 12, wherein the reference signal is determined according to a training sequence code contained in a communication to the multiple antenna receiver system.

14. A multiple antenna receiver system, comprising:
   a plurality of branches coupled to respective antennas;
   two signal paths for each branch corresponding to the real and imaginary parts of each branch;
   an adaptive filter/combiner coupled to the signal paths and configured to generate a combined output signal in which interference has been canceled; and
   wherein the adaptive filter/combiner further comprises respective filters coupled to each signal path in each branch and a summing circuit coupled to sum the signals generated by each filter and generate the combined output signal; and
   wherein the number of antennas is two and wherein the combined output signal is generated in accordance with the following equation:

$$y(i) = \sum_{k=0}^{M-1} w_{1k} u_1(i-k) + \sum_{k=0}^{M-1} w_{2k} u_2(i-k) + \sum_{k=0}^{M-1} w_{3k} u_3(i-k) + \sum_{k=0}^{M-1} w_{4k} u_4(i-k)$$

where: i is an $i^{th}$ signal sample; $w_{1k}$, $w_{2k}$, $w_{3k}$, $w_{4k}$ are kth filter coefficients of each of the respective filters; and M is a number of taps of each filter and $u_1$, $u_2$, and $u_3$, $u_4$ are the separated real and imaginary parts of respective signals received by each antenna.

15. The system of claim 14 wherein each branch further comprises a receive filter and front end processor coupled between the antenna and the two signal paths of each branch coupled to supply a real part and imaginary part of a derotated signal, respectively, to the two signal paths.

16. The system of claim 14 further comprising a mobile telecommunications device including the multiple antenna receiver system.

17. The system of claim 14 further comprising a base station transceiver including the multiple antenna receiver system.

* * * * *

UNITED STATES PATENT AND TRADEMARK OFFICE
CERTIFICATE OF CORRECTION

| | | |
|---|---|---|
| PATENT NO. | : 7,450,924 B1 | Page 1 of 1 |
| APPLICATION NO. | : 11/088368 | |
| DATED | : November 11, 2008 | |
| INVENTOR(S) | : Ayman Mostafa et al. | |

It is certified that error appears in the above-identified patent and that said Letters Patent is hereby corrected as shown below:

Title Page, Item [56] please add to U.S. Patent Documents under "References Cited":
    2005/0042997 A1  02/2005  Steele et al.
    2007/0263744 A1  11/2007  Mostafa Signed and Sealed this Thirty-first Day of March, 2009

JOHN DOLL
*Acting Director of the United States Patent and Trademark Office*